United States Patent [19]

Eisen et al.

[11] Patent Number: 5,523,754
[45] Date of Patent: Jun. 4, 1996

[54] METHOD AND APPARATUS FOR AUTOMATIC KEYBOARD CONFIGURATION BY LAYOUT

[75] Inventors: Ivan R. Eisen, Flower Mound; Frank M. Fandrick, Richardson, both of Tex.

[73] Assignee: International Business Machines Corporation, Armonk, N.Y.

[21] Appl. No.: 124,092

[22] Filed: Sep. 20, 1993

[51] Int. Cl.$^6$ .................................................. H03K 17/94
[52] U.S. Cl. .............................. 341/20; 341/23; 345/168; 364/709.14
[58] Field of Search ................................. 341/20, 22, 23, 341/28; 345/168, 171, 172; 364/709.14

[56] References Cited

FOREIGN PATENT DOCUMENTS 2128005   4/1984   United Kingdom ..................... 341/23

OTHER PUBLICATIONS

Anderson et al., "Changeable Keyboard and Printer Logic", IBM Tech. Discl. Bull., vol. 22, No., Mar. 1980.

Primary Examiner—John K. Peng
Assistant Examiner—Thomas J. Mullen, Jr.
Attorney, Agent, or Firm—A. Bruce Clay

[57] ABSTRACT

Upon selection of an application/process on a computer system, an input device is appropriately mapped/remapped to correspond to the language selected by a user. Thus, a user can switch from one language in a first application to another language in a second application without having to change the entire system.

3 Claims, 5 Drawing Sheets

— EXAMPLE AT INITIALIZATION

| ENG | UK166 | 0 |
| ENG | UK189 | 0 |
| ENG | US | 0 |
| FRE | CA | 0 |
| FRE | FR120 | 0 |
| FRE | FR189 | 0 |
| GER | GE | 0 |
| ITA | IT120 | 0 |
| ITA | IT189 | 0 |

114   116   118

— EXAMPLE, WITH 2 APPLICATIONS RUNNING, ONE IN U.S. ENGLISH AND ONE IN CANADIAN FRENCH

| ENG | UK166 | 0 |
| ENG | UK189 | 0 |
| ENG | US | 1 |
| FRE | CA | 2 |
| FRE | FR120 | 0 |
| FRE | FR189 | 0 |
| GER | GE | 0 |
| ITA | IT120 | 0 |
| ITA | IT189 | 0 |

— EXAMPLE AT INITIALIZATION

| ENG | UK166 | 0 |
|-----|-------|---|
| ENG | UK189 | 0 |
| ENG | US    | 0 |
| FRE | CA    | 0 |
| FRE | FR120 | 0 |
| FRE | FR189 | 0 |
| GER | GE    | 0 |
| ITA | IT120 | 0 |
| ITA | IT189 | 0 |

— EXAMPLE, WITH 2 APPLICATIONS RUNNING, ONE IN U.S. ENGLISH AND ONE IN CANADIAN FRENCH

| ENG | UK166 | 0 |
|-----|-------|---|
| ENG | UK189 | 0 |
| ENG | US    | 1 |
| FRE | CA    | 2 |
| FRE | FR120 | 0 |
| FRE | FR189 | 0 |
| GER | GE    | 0 |
| ITA | IT120 | 0 |
| ITA | IT189 | 0 |

னैः5,523,754

METHOD AND APPARATUS FOR AUTOMATIC KEYBOARD CONFIGURATION BY LAYOUT

TECHNICAL FIELD OF THE INVENTION

This invention relates in general to computer software, and in particular to a method and apparatus for automatically reconfiguring a keyboard input device to support the appropriate language when moving from application to application on a desktop.

BACKGROUND OF THE INVENTION

As is well known, there are many different languages and alphabets in existence and currently in use around the world. Languages are not specific to one particular country and many countries use multiple languages. For example, Switzerland has three official languages with 65% of the population speaking German, 18% French, and 12% Italian. The remaining population speaks other languages, with English being a widely used additional language. Also, Canada uses both French and English as official languages; Belgium has a split of 55% Dutch, 40% French, and 5% German again, with English being a widely used additional language. In countries where multiple languages are used, it is often necessary to switch from one computer application to another in which separate languages are used. Currently, there is no facility to automatically change the keyboard input language to match the application language when a user moves from one application in a first language to a second application in a second language.

In a windowing application, a multi-lingual user must manually request a remapping of the keyboard for the entire system each time they move to a window which contains text in a different language. For example, a user in Canada may well have multiple applications running, with some of the applications being in French and others in English. Multi-lingual code pages of operating systems support both these languages as far as the display of text is concerned. If the user is looking at an English application, the keyboard is set to receive English as input. If the user moves to the French application they must interrupt their session and issue a systems command which sets the entire system to receive French characters as input. Going back to an English application again causes the user to do a manual reset. Thus, there is a need for a method and apparatus to automatically reconfigure a keyboard input device to support the appropriate language when switching from application to application.

SUMMARY OF THE INVENTION

The present invention provides a method and apparatus for automatically remapping an input device of a computer system which substantially reduces or eliminates the problems associated with the prior art. The present invention allows a user to switch from application to application and input data using a different keyboard map without having to reset the entire system each time.

In accordance with one aspect of the present invention, a method is provided for automatically remapping a computer system input device to correspond to a language of an application/process selected for use. A language/input device/process table is first built. Then, an appropriate language is designated for at least one process/application available for use on the computer system. The input device is then automatically remapped for the application/process in accordance with the language selected and designated in the table.

BRIEF DESCRIPTION OF THE DRAWINGS

For a more complete understanding of the present invention and the advantages thereof, reference is now made to the Detailed Description taken in conjunction with the attached Drawings, in, which:

FIG. 8 illustrates a detailed view of an LKP Table as used in conjunction with the flowchart of FIG. 3.

DETAILED DESCRIPTION OF THE INVENTION

Figure 1:
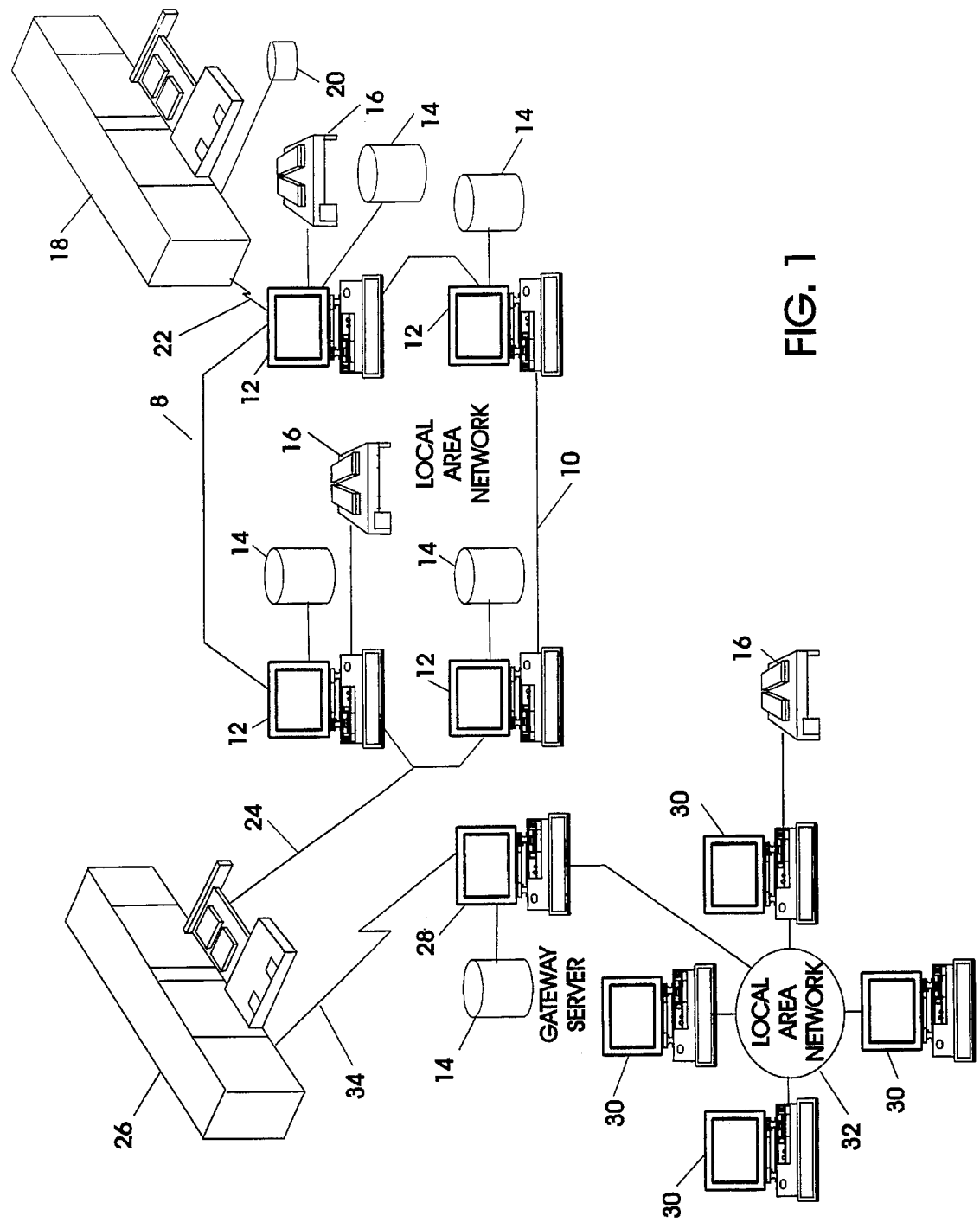
FIG. 1 is a schematic illustration of a data processing system in accordance with the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. The gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California, while LAN 10 may be located within Texas, and mainframe computer 18 may be located in New York.

Figure 2:
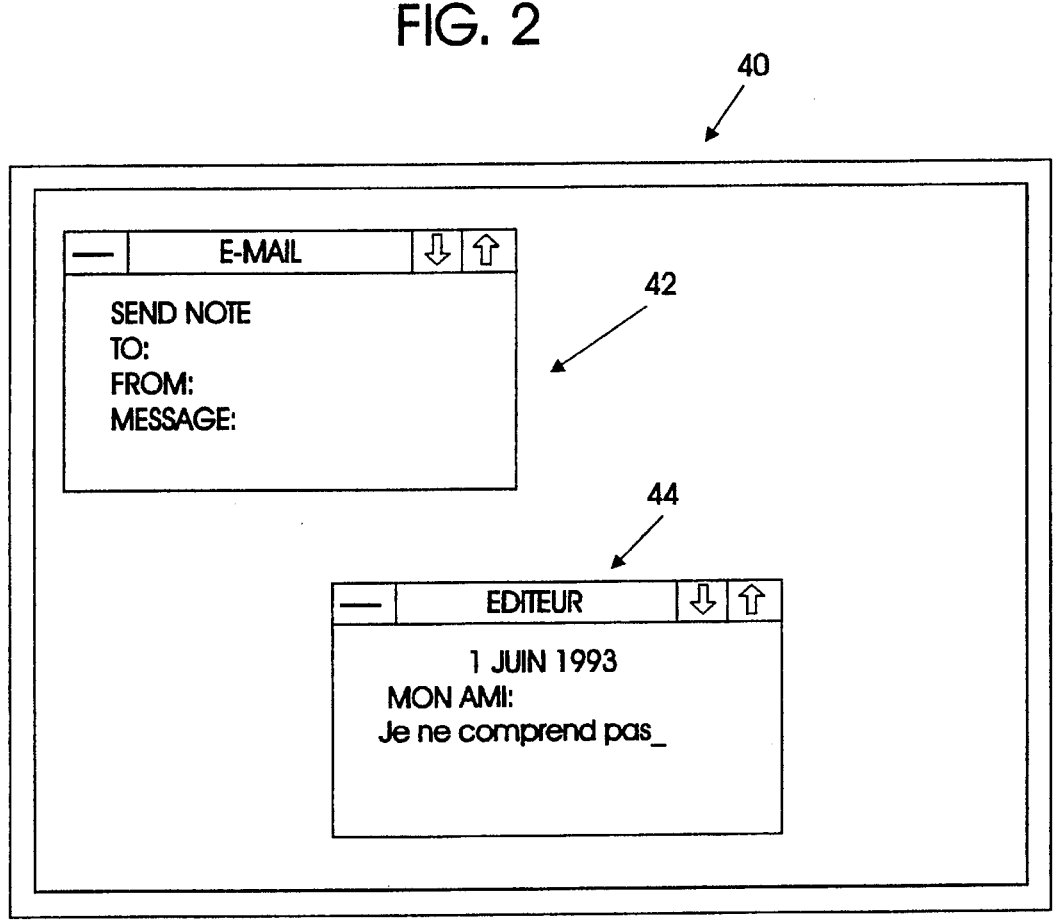
FIG. 2 is a graphical representation of a computer screen on which two applications, each in a different language, are running simultaneously.

Referring to FIG. 2, a monitor screen 40 as used with an individual computer 12 or 30 (see FIG. 1) is shown. For example only, the screen 40 displays two separate applications which are being run simultaneously. The first application as generally indicated by reference numeral 42, is an electronic mail application running in English. The second application generally identified by reference numeral 44, is an editor application running in French. If the user/operator has selected English as the language for the computer system for which screen 40 is being used, only English may be typed/entered by the user into application 42 or 44. Thus, the user would be able to enter appropriate English information into the first application 42 as currently set for the system. However, if the user desires to then switch to the second application 44 and enter data in French, it would first be necessary to reset the entire system to accept French input. Without switching the entire system, the user would, regardless of what is intended, be forced to use English keyboard designations in the second application 44.

Figure 3:
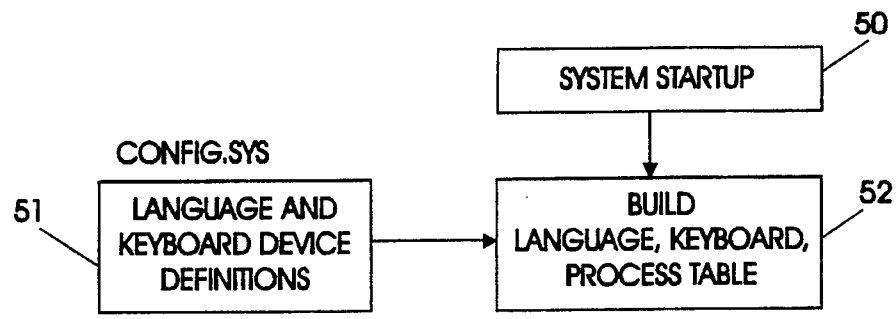
FIG. 3 is a flowchart showing implementation of the method of the present invention upon system startup.

Referring next to FIG. 3, a flowchart illustrating the present invention upon system startup is shown. Upon system startup at block 50, using Config. Sys language and keyboard device definitions at block 51, a Language, Keyboard, Process Table (LKP Table) is built at block 52. An example of the Language, Keyboard, Process Table built at block 52 is shown in greater detail and will be described with reference to FIG. 8.

Figure 4:
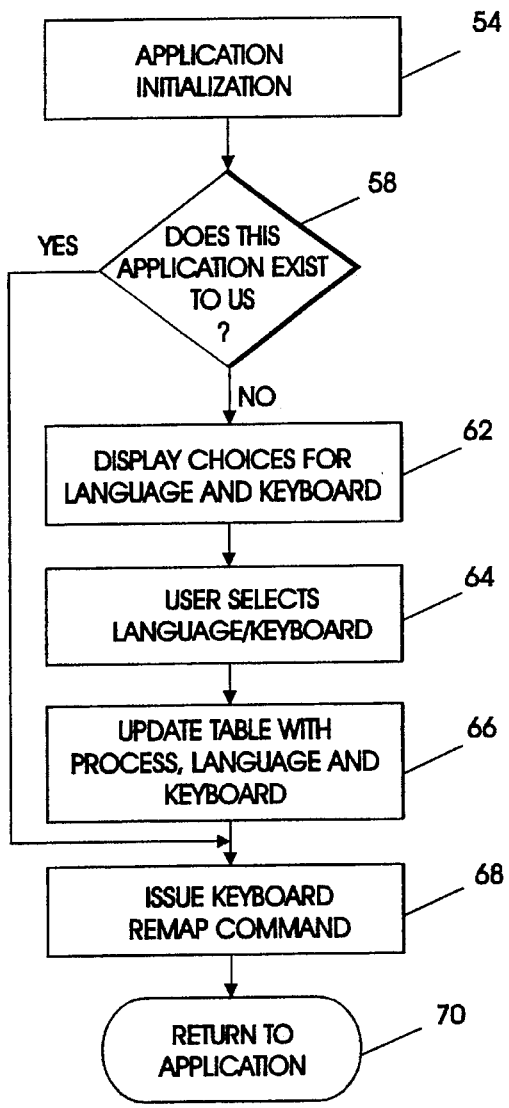
FIG. 4 is a flowchart showing implementation of the method of the present invention upon application initialization.

Referring next to FIG. 4, the method of the present invention upon initialization of an application is shown. In block 54, an application/process is initialized. The present invention then proceeds to decision block 58 where it is determined whether or not this application exists to us (i.e., previously selected and registered with the LKP Table). If the response to decision block 58 is no, the choices for the language and keyboard setups are displayed at block 62. The language/keyboard selection choices are shown and will be discussed in greater detail with reference to FIG. 7. At block 64, the user selects the appropriate language/keyboard to be used with this application. The LKP Table is updated with the appropriate process (i.e., a system generated identifier referring to this application), language, and keyboard selections at block 66. Subsequent to block 66 or if the response to decision block 58 is yes, a keyboard remap command is issued at block 68 followed by a return to the application at 70. Thus, upon selection of an application for initialization, the present invention either automatically remaps the keyboard for the previously selected language or allows the user to make a desired selection just for this application rather than the entire system.

Figure 5:
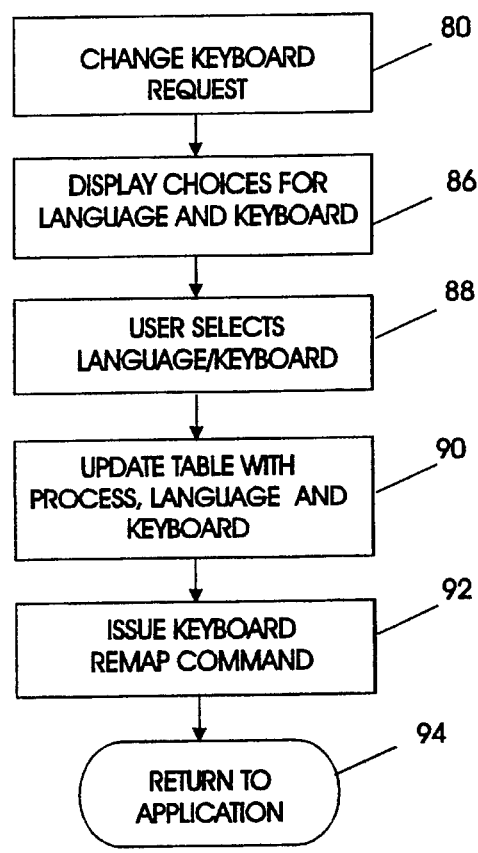
FIG. 5 is a flowchart showing implementation of the method of the present invention upon a change keyboard request.

Referring next to FIG. 5, the method of the present invention upon receipt of a request to change the keyboard mapping for an application is illustrated. At block 80, a change keyboard request is initiated by a user/operator. One possible method for initiating such a request is through the use of a Chg. Keybd. command 82 from a pull-down menu 84 (see FIG. 6). Choices for language and keyboard (as provided and available through the computer system) are then displayed at block 86 (see FIG. 7 for example). The user/operator selects the desired language/keyboard designation for the application at block 88 by any appropriate method such as highlighting or clicking with a mouse. The LKP Table is updated at block 90 to indicate the appropriate language and keyboard selection for the indicated application/process thus making a switch out of and back into this application automatic with regards to the mapping of the keyboard for the appropriate language. At block 92, the appropriate keyboard remap command is issued followed by a return to the application at 94.

Figure 6:
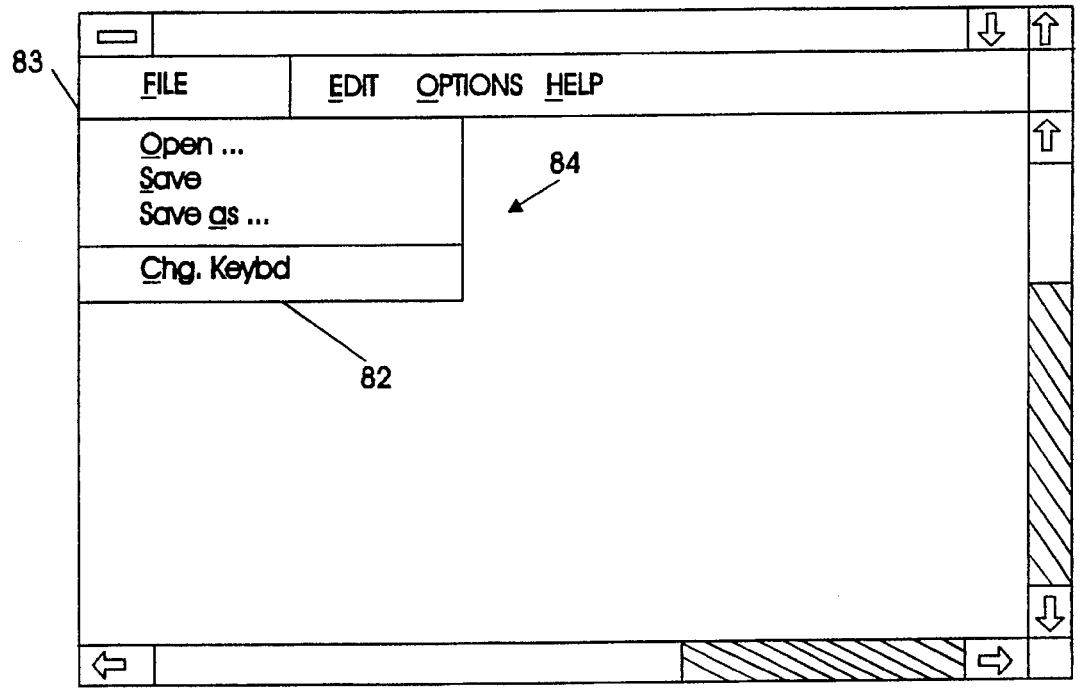
FIG. 6 is a pull-down menu option for initiating a keyboard change in accordance with the present invention.

Referring to FIG. 6, one embodiment of a pull-down menu used in conjunction with the present invention to initiate a change to the keyboard designation is shown. By selecting, for example, the File command 83, a pull-down menu generally identified by the reference numeral 84 is displayed. The user would then select the Chg. Keybd. command 82 to initiate the selection of a language/keyboard for a particular application.

Figure 7:
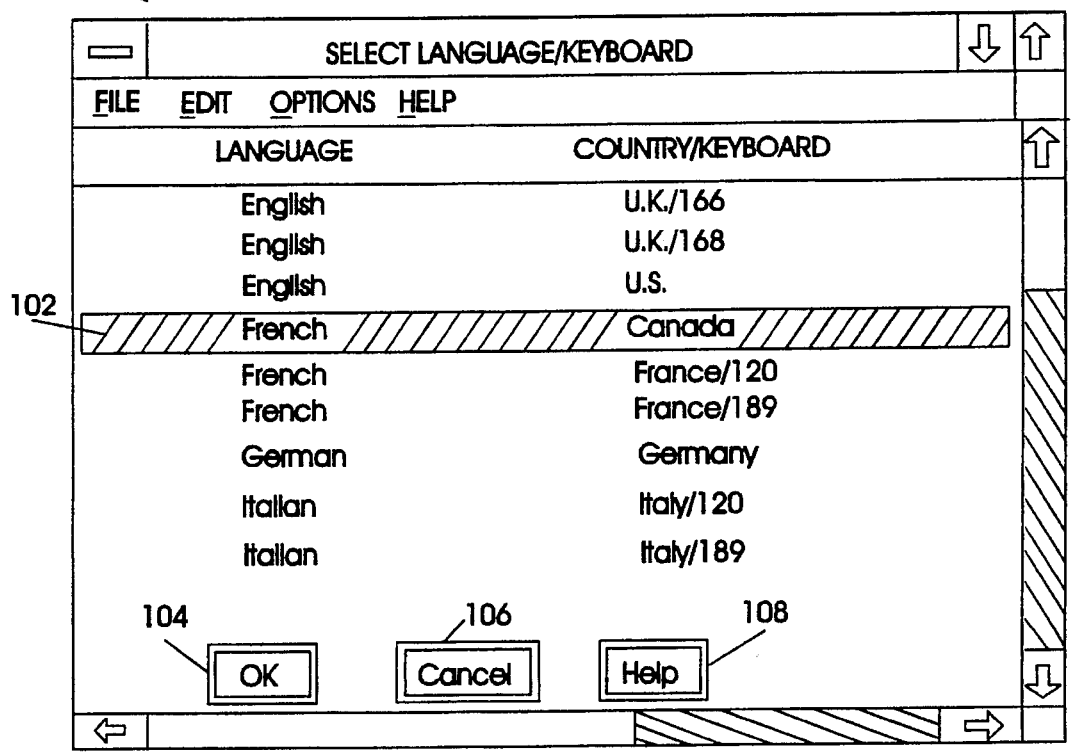
FIG. 7 is one embodiment of a language selection panel for use with the present invention.

Referring next to FIG. 7, a Select Language/Keyboard panel 100 is shown. The panel 100 will appear upon selection of the Chg. Keybd. command 82 or upon the first designation of an application/process for use on a computer system. By any appropriate method (such as highlighting 102), the user selects the language and country/keyboard from the list displayed thereon. Once selected, the user will then indicate by selection of OK button 104, Cancel button 106, or Help button 108 the appropriate action. Thus, by selecting the OK button 104, the French Canadian language and keyboard would be entered into the LKP Table, as previously described in FIG. 3 and as shown in greater detail in FIG. 8 for this application/process.

Referring now to FIG. 8, for example only, a first LKP Table 110 and a second LKP Table 112 for use with the present invention are illustrated. The tables 110 and 112 have three columns for entries. In a first column generally indicated by the reference numeral 114, a language ID is indicated. In a second column generally identified by the reference numeral 116, a keyboard map ID is indicated. In a third column generally identified by the reference numeral 118, a process/application identifier is indicated. Thus, in table 110, there is shown one example of an LKP Table which will be built upon initialization of a computer system. The table 110 shows that no language or keyboard has been selected by a user for use with an application/process. Table 112 shows that there are two applications running on the computer system in use. One application as generally indicated by the reference numeral 120, is using the English language with a US mapped keyboard and a second application as generally identified by the reference numeral 122, is using the French language with a Canadian mapped keyboard. Thus, the two applications, for example, applications 42 and 44 as shown in FIG. 2, may receive input from a user in the correct language without having to change the entire system setup.

Although the term keyboard is used throughout the foregoing description, it is to be understood that keyboard is meant to imply any appropriate input device such as, for example, a touchscreen, a virtual keyboard, an audio input device, etc. Additionally, it is to be understood that the LKP Table may be optionally stored for reuse every time the computer system is initialized.

Although the present invention has been particularly shown and described with reference to a preferred embodiment, it will be understood by those skilled in the art that various changes in form and detail may be made without departing from the spirit and the scope of the invention.

What we claim is:

1. A method of automatically re-mapping an input device, in a multi-windowed computer system which includes a plurality of applications which may run simultaneously on the computer system and which includes a capability for preselecting a system input language for use with all of the plurality of applications on the computer system, in order to make available to a user a selected input language which is different from the preselected system input language for at least one of the plurality of applications without changing the preselected system input language for all remaining ones of the plurality of applications, comprising the steps of:

building a language process table comprising input languages available to the user;

inputting in the table an identifier for each of the plurality of applications, such that the identifier for a given application is in correspondance with the desired input language for that application;

selecting at least one of the plurality of applications to be active; and automatically mapping the input device from the preselected system input language to the user selected input language in accordance with the correspondance set forth in said language process table, wherein upon completion by the user of the at least one of the plurality of applications the input device is mapped back to the preselected system input language.

2. The method of claim 1, further comprising the step of:

storing said language process table on a storage device associated with the multi-windowed computer system for recurring use.

3. The method of claim 1, wherein said step of building comprises:

selecting a language from a list stored on a storage device associated with the multi-windowed computer system.

* * * * *